Feb. 7, 1933. H. C. BERBERICH 1,896,132
ARTIFICIAL BAIT
Filed March 7, 1932

Harry C. Berberich,
INVENTOR.

BY J Stanley Burch
ATTORNEY.

Patented Feb. 7, 1933

1,896,132

UNITED STATES PATENT OFFICE

HENRY C. BERBERICH, OF ELMWOOD PARK, ILLINOIS

ARTIFICIAL BAIT

Application filed March 7, 1932. Serial No. 597,388.

The present invention relates to an artificial bait, which embodies amongst other features, a spoon and a separable hook and buck tail so that either of the latter mentioned elements can be quickly and conveniently attached to or removed from the spoon as the occasion might require.

One of the chief characteristics of the present invention resides in providing the spoon with a member which constitutes a support for both the hook and buck tail, the latter being associated with the member in a manner to permit either to be quickly connected with or disconnected from the member.

Another object of importance resides in constructing the supporting member in a manner so that the shank of the buck tail when associated with said member assists in maintaining the hook against casual displacement from its normal active position.

In carrying out the invention I also provide the spoon with a resilient finger arranged above the shank of the hook and terminating above the barb thereof and utilized as a guard to direct weeds and other foreign matter away from the hook.

The nature and advantages of the invention will be better understood when the following detail description is read in connection with the accompanying drawing, the invention residing in the construction, combination and arrangement of parts as claimed.

In the drawing forming part of this application like numerals of reference indicate similar parts in the several views and wherein.

Figure 1:
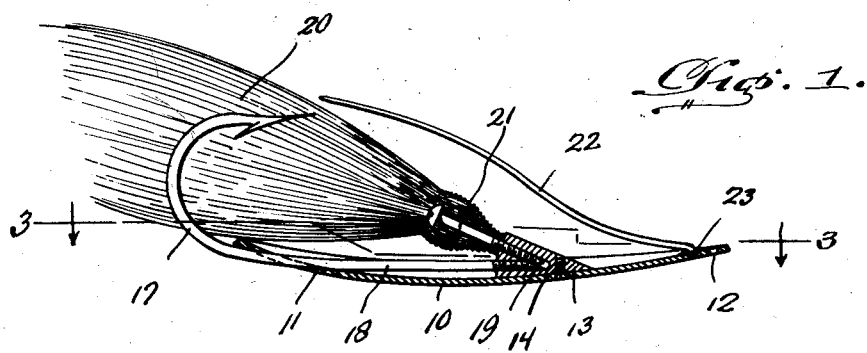
Figure 1 is a side elevation partly in section of the bait constituting the subject matter of the present invention.
Figure 2:
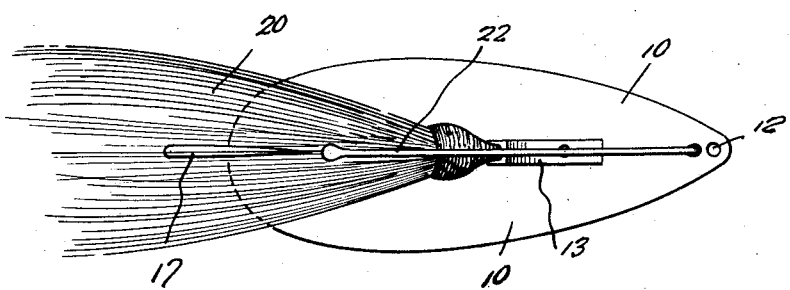
Figure 2 is a top plan view.
Figure 3:
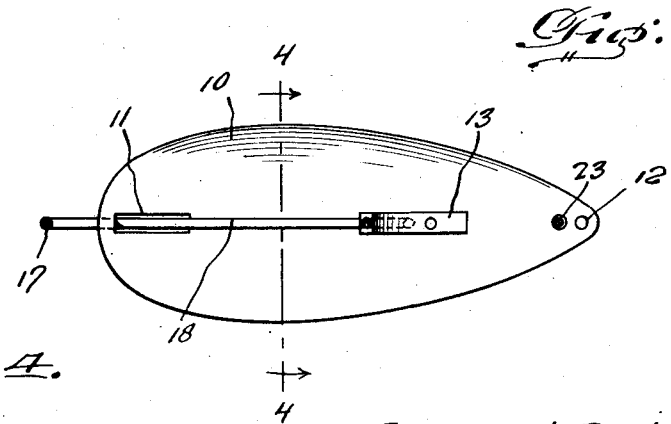
Figure 3 is a sectional view on line 3—3 of Figure 1.
Figure 4:
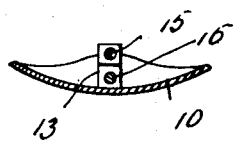
Figure 4 is a sectional view on line 4—4 of Figure 3.

Referring to the drawing in detail, 10 indicates the spoon which is of concavo-convex formation having a short longitudinal slot 11 adjacent its wide end and an opening 12 adjacent its opposite end to permit the attachment thereto of a fishing line.

Secured to the upper face of the spoon 10 along the longitudinal center thereof is a block or member 13 which constitutes a common support for both the hook and buck tail in a manner to be presently described. It will be noted upon inspection of Figure 1 that the member 13 rests upon the spoon and in addition to being soldered thereto, is fastened to the spoon by a screw 14 which is passed into the member from the under side of the spoon. The member 13 can vary in size and shape, but is preferably of the configuration illustrated having its upper surface beveled or inclined in the direction of the spoon. The member is also provided with spaced upper and lower threaded bores 15 and 16 respectively. The upper bore 15 is inclined with relation to the lower bore 16 and communicates with the inner end of the latter mentioned bore for a purpose to be presently described.

The hook 17 has its shank 18 threaded into the bore 16 as clearly illustrated in Figure 1, and the end of the shank is beveled as at 19. The shank also passes through the slot 11 of the spoon and is normally arranged for use in the position illustrated in Figure 1.

The buck tail 20 is wound about a headed shank 21 which is also threaded for a portion of its length and which portion is threaded into the inclined bore 15 of the supporting member 13. When the shank 21 is threaded within the bore it contacts the beveled surface 19 of the shank of the hook and thereby prevents the hook from turning within its bore, and which obviously maintains the hook against casual displacement from its normal active position. When the buck tail is associated with the supporting member 13 it largely conceals the hook from view. By virtue of the construction thus far described it is manifest that either the hook 17 or the buck tail 20 can be quickly and conveniently replaced as the occasion might require, as both of these elements are separably connected with the supporting member 13.

Suitably attached to the spoon 10 adjacent its forward end is a resilient finger 22 which extends above the member 13 and terminates in a plane above the barb of the hook. This finger constitutes a weed guard, and serves to direct weeds and other foreign matter away from the hook, but does not in any way interfere with the function of the hook. The forward end of the finger 22 is preferably offset slightly and threaded into an opening in the spoon as illustrated at 23 in Figure 1. When the bait is drawn through the water, it moves with a motion simulating the movements of live minnow.

While it is believed that from the foregoing description the nature and advantages of the invention will be readily understood I desire to have it known that I do not limit myself to what is herein illustrated or described and that such changes may be resorted to, when desired as fall within the scope of what is claimed.

What is claimed is:

1. An artificial bait comprising a spoon of concavo-convex formation having a longitudinal slot adjacent one end, a member secured to the upper surface of the spoon, a hook having its shank received by said slot and detachably connected with said member, and a buck tail including a shank separably connected with the member above the shank of the hook.

2. An artificial bait comprising a spoon of concavo-convex formation having a longitudinal slot adjacent one end, a member secured to the upper surface of the spoon, a hook having its shank received by said slot and detachably connected with said member, a buck tail including a shank, separably connected with the member above the shank of the hook, and a resilient finger terminally secured to the spoon adjacent its forward end and extending above the barb of the hook for the purpose specified.

3. An artificial bait comprising a spoon of concavo-convex formation having a longitudinal slot adjacent one end, a member secured to the upper surface of the spoon and having a threaded bore, a hook having its shank passed through the slot and threaded into said bore, and a buck tail including a shank detachably connected with said member above the shank of the hook.

4. An artificial bait comprising a spoon of concavo-convex formation having a longitudinal slot adjacent one end, a member secured to the upper surface of the spoon and having an inclined threaded bore, a hook having its shank passed through the slot and detachably connected with said member, and a buck tail including a shank arranged above the shank of the hook and threaded into said bore.

5. An artificial bait comprising a spoon of concavo-convex formation having a longitudinal slot adjacent one end, a member secured to the upper surface of the spoon and having spaced upper and lower threaded bores, the upper bore being inclined with relation to the lower bore, a hook having its shank passed through the slot and threaded into the lower bore, and a buck tail having a shank threaded into the said inclined bore.

6. An artificial bait comprising a spoon of concavo-convex formation having a longitudinal slot adjacent one end, a member secured to the upper surface of the spoon and having spaced upper and lower threaded bores, said upper bore being inclined and communicating with the innermost end of the lower bore, a hook having its shank passed through the slot and threaded into the lower bore, the end of said shank being beveled, and a buck tail including a shank threaded into the upper inclined bore and contacting the beveled surface of the shank of the hook to hold the latter against casual displacement.

In testimony whereof I affix my signature.

HARRY C. BERBERICH.